Patented Jan. 3, 1928.

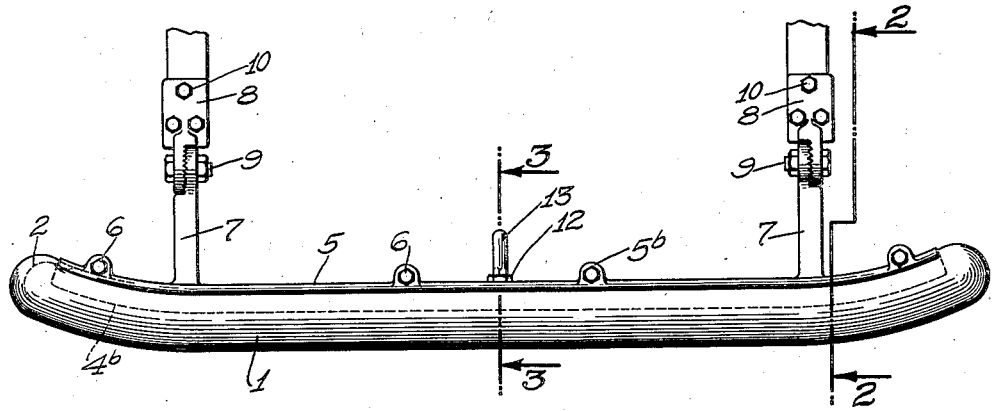
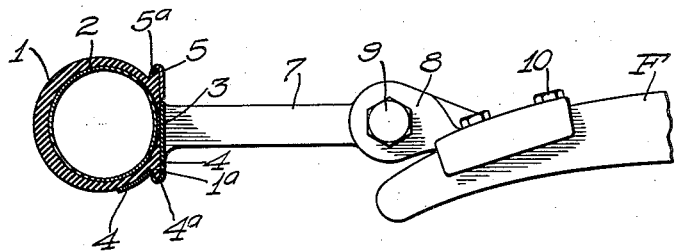
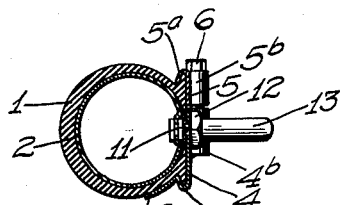

1,654,572

UNITED STATES PATENT OFFICE.

BURLE V. BAYNE, OF SAN DIEGO, CALIFORNIA.

PNEUMATIC BUMPER.

Application filed March 11, 1925. Serial No. 14,700.

My invention relates to pneumatic bumpers particularly adapted for automobiles, and the objects of my invention are: first, to provide a flexible resilient pneumatic bumper which may be readily applied to the front and rear ends of an automobile; second, to provide a pneumatic bumper having a gas inflated flexible tube to receive the shock of the collision; third, to provide a pneumatic bumper having a gas inflated flexible tube and a yieldable protecting casing or covering for protecting the tube in case of collision; fourth, to provide a pneumatic bumper having a long gas inflated rubber inner tube and a rubber protecting casing surrounding said tube adapted to be supported by a clamp and bracket means at the front and rear ends of an automobile; fifth, to provide a novelly constructed clamping and bracket means for supporting the bumper; sixth, to provide as a whole a novelly constructed pneumatic bumper, and seventh, to provide a bumper of this class which is simple and economical of construction, durable, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a top view of my pneumatic bumper secured to the forward end of the frame of an automobile, showing the frame fragmentarily; Fig. 2 is an enlarged sectional elevational view thereof, taken at 2—2 of Fig. 1, and Fig. 3 is an enlarged transverse sectional view, taken through 3—3 of Fig. 1.

Like characters of reference refer to similar parts and portions throughout the several views of the drawings.

The bumper casing 1, tube 2, flap 3, clamp members 4 and 5, screws 6, arms 7, brackets 8, bolts 9, screws 10, valve stem 11, nut 12, and the valve cap 13, constitute the principal parts and portions of my pneumatic bumper structure for automobiles in one form of construction.

The cross-section of the protecting casing 1 is preferably in the form of the conventional clincher tire casing for automobiles, as shown best in Figs. 2 and 3. It will be noted, however, that the cross-section of the casing or the exterior surface may be of any suitable shape desired, such as triangular, diamond, rectangular and the like. The length of the casing 1 is substantially the same as the conventional steel bumpers now in use and is preferably molded so that its ends extend inwardly slightly on a curved form. The ends of the casing 1 are wholly enclosed, as shown best in Fig. 1, and are preferably molded in this manner.

The means for clamping the inner open sides of the casing 1 together consists of clamp members 4 and 5 which are formed of steel plates to conform with the rear surface of the casing. The clamp members 4 and 5 are provided respectively at their lower and upper edges with forwardly and inwardly bent ledges or clamp portions 4ª and 5ª which are adapted to receive the outwardly extending ridges 1ª or clincher portions of the casing. The upper, removable clamp member 5 is preferably considerably narrower than the stationary clamp member 4, the latter clamp member preferably extending across the separated portions at the inner side of the casing, as shown best in Figs. 2 and 3. These clamp members are secured relatively to each other by means of a plurality of screws 6 which extend through inwardly extending lugs 4ᵇ and 5ᵇ at the inner sides of the clamp members.

Within the casing 1 is positioned the yieldable rubber inner tube 2 which extends from end to end of the hollow casing 1 and is provided intermediate its ends with a valve stem 11 which extends through an opening in and intermediate the ends of the lower stationary clamp member 4. Intermediate the tube 2 and the separated portion at the inner side of the casing 1 is positioned a flap 3 similar in construction to the conventional flap used in demountable rim tires for automobiles. The valve stem 11 is held in position against the lower clamp member 4 by means of a nut 12, and over the outer end of the valve stem is provided a valve dust cap 13.

To the inner side of the lower clamp member 4 and near the ends thereof are provided a pair of inwardly extending supporting arms 7 which are pivotally supported, by means of bolts 9, at the outer ends of brackets 8 which are secured, by means of screws 10, to the forward or rear ends of the automobile frame F. The adjacent engaging faces of the arms 7 and the brackets 8 are preferably provided with outwardly radiating ridges, as shown best in Fig. 1, to more securely hold the arms in certain positions when the bolts 9 are tightened.

It will be here noted that the lower supporting or clamp member 4 is preferably provided with a forwardly extending ledge 4c near its lower edge to suport the casing and tube against sag, particularly when the same is used as a seat or as a support when transporting baggage and the like thereon. The lug 4b is preferably integrally secured to the inwardly turned edge of the clamp portion 4a of the clamp member 4 as shown.

It will be also noted that instead of the bumper being made of one length extending from one side of the vehicle to the other, the same may be made in sections if desired without deviating from the spirit of the invention. It will be further noted that the casing and tube may be combined as a single unit pneumatic tube if desired.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a pneumatic bumper structure, a gas-inflated yieldable tube, a pair of separable clamp members of approximately the length of said tube for removably supporting the same at the outer side thereof, bracket means for supporting said clamp members at the ends of a vehicle, and a valve stem communicating with the interior of said tube and extending toward said vehicle through only one of said clamp members.

2. In a pneumatic bumper structure, a gas-filled yieldable tube, a pair of spaced apart bracket members secured at the ends of a vehicle, a clamp portion permanently secured thereto, and a second clamp portion removably secured to said first mentioned clamp portion, said first and second mentioned clamp portions extending approximately the length of said tube and removably supporting the same at the outer side thereof.

3. In a pneumatic bumper structure, a longitudinal molded rubber casing provided with oppositely disposed, upwardly and downwardly extending ridges on the one side thereof, a pair of spaced apart bracket members, a substantially U-shaped clamp member secured to said bracket members, the one leg of the clamp member being considerably longer than the other and provided with a forwardly extending flange integral with the shorter leg thereof, and another substantially U-shaped clamp member with one leg considerably longer than the other removably secured to said first mentioned clamp member, said rubber casing being removably secured to said clamp members by means of its extending ridges.

4. In a pneumatic bumper structure, a longitudinal molded rubber casing having curved end portions with the ends thereof molded to form closed ends and pockets in said ends, the one side of said casing being slit a portion of the distance from one end to the other and provided with oppositely disposed, upwardly and downwardly extending ridges on opposite sides of the opening of the slit, a pneumatic tube positioned within said casing with its ends positioned in the pockets at the ends of said casing, a pair of spaced apart bracket members, a substantially U-shaped clamp member secured to said bracket, the one leg of the clamp member being considerably longer than the other and provided with a forwardly extending flange integral with the shorter leg thereof, and another substantially U-shaped clamp member with one leg considerably longer than the other removably secured to said first mentioned clamp member, said rubber casing being removably secured to said clamp member by means of its extending ridges.

In testimony whereof, I have hereunto set my hand at San Diego, California, this 2nd day of March, 1925.

BURLE V. BAYNE.